US012759145B2

(12) United States Patent
Wise et al.

(10) Patent No.: US 12,759,145 B2
(45) Date of Patent: Oct. 13, 2026

(54) LOCAL IDLE TIME UTILIZATION IN CENTRALLY CONTROLLED MOBILE ROBOTS

(71) Applicant: Skild-Fetch LLC, Pittsburgh, PA (US)

(72) Inventors: Melonee Wise, San Jose, CA (US); Aaron Hoy, San Jose, CA (US); Derek King, Seattle, WA (US); Micaela Angeli, Lincolnshire, IL (US); Chinmay Shah, San Jose, CA (US)

(73) Assignee: Skild-Fetch LLC, Pittsburgh, PA (US)

( * ) Notice: Subject to any disclaimer, the term of this patent is extended or adjusted under 35 U.S.C. 154(b) by 220 days.

(21) Appl. No.: 17/971,030

(22) Filed: Oct. 21, 2022

(65) Prior Publication Data

US 2024/0131703 A1 Apr. 25, 2024
US 2024/0227183 A9 Jul. 11, 2024

(51) Int. Cl.
*B25J 9/16* (2006.01)

(52) U.S. Cl.
CPC ........... *B25J 9/1661* (2013.01); *B25J 9/1653* (2013.01); *B25J 9/1664* (2013.01); *B25J 9/1692* (2013.01)

(58) Field of Classification Search
CPC ...... B25J 9/1661; B25J 9/1653; B25J 9/1664; B25J 9/1692; G05D 2105/28; G05D 1/225; G05D 1/644; G05D 1/6987; G05D 2107/70; G05D 2109/10; G06Q 10/0631; G06Q 10/06311; G06Q 10/08; G05B 2219/32291; G05B 19/41895
See application file for complete search history.

(56) References Cited

U.S. PATENT DOCUMENTS

| | | | | |
|---|---|---|---|---|
| 11,400,823 | B1 * | 8/2022 | Sampath | B60L 58/12 |
| 11,567,504 | B1 * | 1/2023 | Bai | G05D 1/0274 |
| 2020/0262650 | A1 * | 8/2020 | Agarwal | B65G 1/1373 |
| 2022/0048186 | A1 * | 2/2022 | Sharma | G06F 11/3006 |
| 2022/0147059 | A1 * | 5/2022 | Borne-Pons | G05D 1/6985 |
| 2022/0197304 | A1 * | 6/2022 | Cochran | G05D 1/0297 |
| 2023/0157506 | A1 * | 5/2023 | Tamino | G05D 1/0274 15/319 |

OTHER PUBLICATIONS

International Search Report and Written Opinion for International Application No. PCT/US2023/34779 mailed on Jan. 12, 2024.

* cited by examiner

*Primary Examiner* — Khoi H Tran
*Assistant Examiner* — Tien Minh Le
(74) *Attorney, Agent, or Firm* — Fenwick & West LLP

(57) ABSTRACT

A method includes: storing, at a mobile robot, a local repository of self-assigned task definitions; determining, at a processor of the mobile robot, that a local activity metric associated with tasks assigned to the mobile robot by a central server meets an idle criterion; in response to determining that the local activity metric meets the idle criterion, selecting, by the processor, one of the self-assigned task definitions from the local repository; and initiating execution of a self-assigned task corresponding to the selected self-assigned task definition at the mobile robot.

20 Claims, 7 Drawing Sheets

404 408 412 416

| Task | Subsystem(s) | Prioritization | Prev. Run | |
|---|---|---|---|---|
| Calibrate odo. | Navigation free<br>Charging free | Weekly; Elevate if localization err. > [X] | 13/09/2022 | 400-1 |
| Post-process | Charging busy OR battery > 70% | Stored data > [Y] | 18/09/2022 | 400-2 |
| Map region A | Navigation free<br>Charging free | Monthly | 14/07/2022 | 400-3 |
| Map region B | Navigation free<br>Charging free | Monthly | 26/08/2022 | 400-4 |

LOCAL IDLE TIME UTILIZATION IN CENTRALLY CONTROLLED MOBILE ROBOTS

BACKGROUND

Autonomous or semi-autonomous mobile robots, e.g., deployed in facilities to transport items such as parcels and the like, can be assigned tasks from a central computing device such as a server. The server can, for example, distribute a set of tasks between a fleet of the mobile robots. Task assignments to the mobile robots, in other words, can be centralized. Centralized task assignment, however, can lead to suboptimal usage of the mobile robots, and/or increased computational burden on the server.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
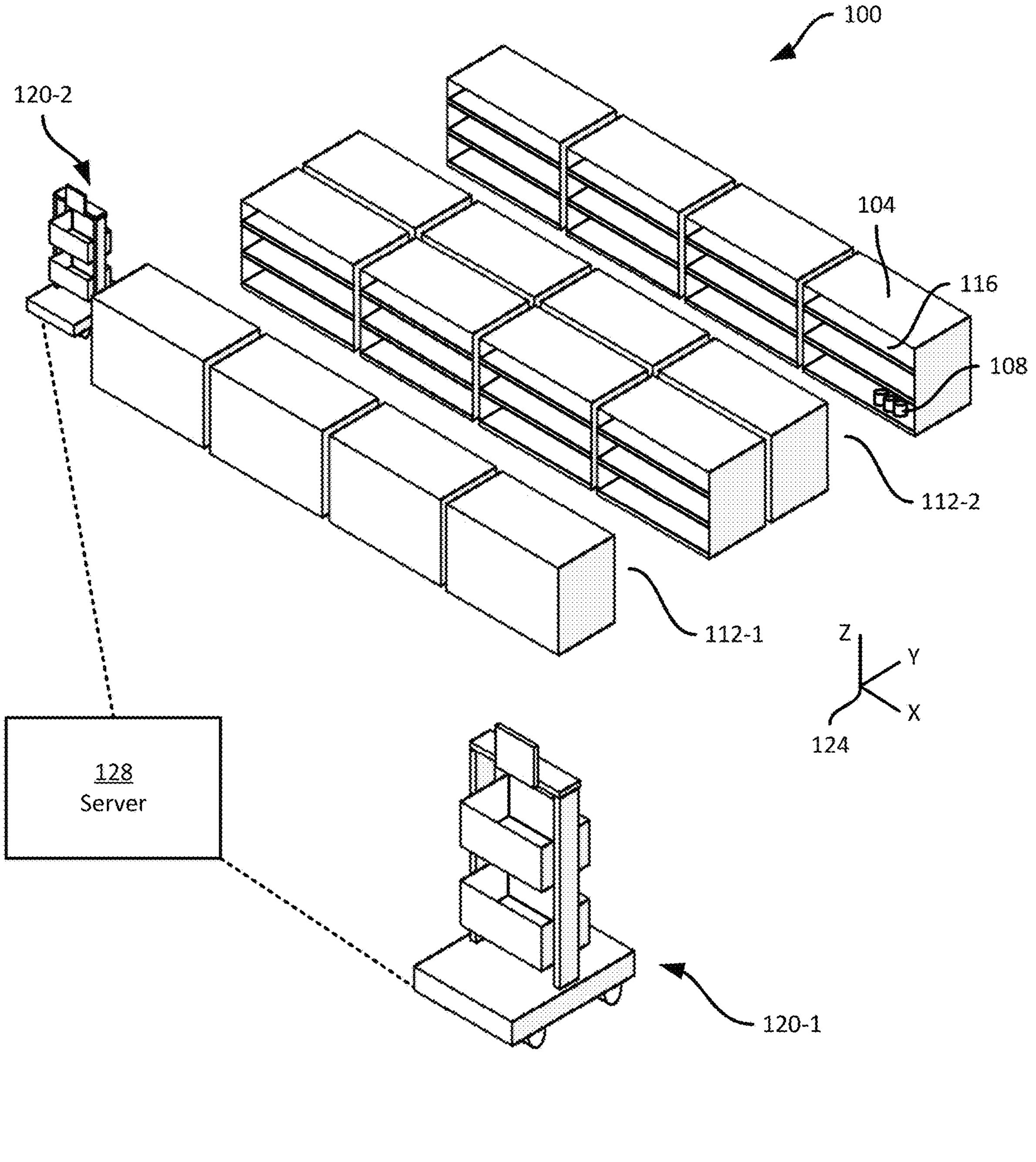
FIG. 1 is a diagram of item-handing mobile robots deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: storing, at a mobile robot, a local repository of self-assigned task definitions; determining, at a processor of the mobile robot, that a local activity metric associated with tasks assigned to the mobile robot by a central server meets an idle criterion; in response to determining that the local activity metric meets the idle criterion, selecting, by the processor, one of the self-assigned task definitions from the local repository; and initiating execution of a self-assigned task corresponding to the selected self-assigned task definition at the mobile robot.

Additional examples disclosed herein are directed to a mobile robot, comprising: a memory storing a local repository of self-assigned task definitions; a locomotive assembly; a communications interface communicatively connecting the mobile robot with a central server; and a processor configured to: determine that a local activity metric associated with tasks assigned to the mobile robot by the central server meets an idle criterion; in response to determining that the local activity metric meets the idle criterion, select, one of the self-assigned task definitions from the local repository; and initiate execution of a self-assigned task corresponding to the selected self-assigned task definition at the mobile robot.

FIG. 1 illustrates an interior of a facility 100, such as a warehouse, a manufacturing facility, or the like. The facility 100 includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112; similar nomenclature is used herein for other components). As shown in FIG. 1, support structures 104 in the form of shelf modules include support surfaces 116 supporting the items 108. The support structures 104 can also include pegboards, bins, or the like, in other examples.

In other examples, the facility 100 can include fewer aisles 112 than shown, or more aisles 112 than shown in FIG. 1. The aisle 112, in the illustrated example, are formed by sets of eight support structures 104 (four on each side). The facility can also have a wide variety of other aisle layouts, however. As will be apparent, each aisle 112 is a space open at the ends, and bounded on either side by a support structure 104. The aisle 112 can be travelled by humans, vehicles, and the like.

The items 108 may be handled according to a wide variety of processes, depending on the nature of the facility. In some examples, the facility is a shipping facility, distribution facility, or the like, and the items 108 can be placed on the support structures 104 for storage, and subsequently retrieved for shipping from the facility. Placement and/or retrieval of the items 108 to and/or from the support structures can be performed or assisted by mobile robots, of which two example robots 120-1 and 120-2 are shown in FIG. 1. A smaller or greater number of robots 120 can be deployed in the facility 100 than the two robots 120 shown in FIG. 1, for example based on the size and/or layout of the facility 100. Components of the robots 120 are discussed below in greater detail. In general, each robot 120 is configured to transport items 108 within the facility 100.

Each robot 120 can be configured to track its pose (e.g., location and orientation) within the facility 100, e.g., within a coordinate system 124 previously established in the facility 100. The robots 120 can navigate autonomously within the facility 100, e.g., travelling to locations assigned to the robots 120 to receive and/or deposit items 108. The items 108 can be deposited into or onto the robots 120, and removed from the robots 120, by human workers and/or mechanized equipment such as robotic arms and the like deployed in the facility 100. The locations to which each robot 120 navigates can be assigned to the robots 120 by a central server 128. That is, the server 128 is configured to assign tasks to the robots 120. Each task can include either or both of one or more locations to travel to, and one or more actions to perform at those locations. For example, the server 128 can assign a task to the robot 120-1 to travel to a location defined in the coordinate system 124, and to await the receipt of one or more items 108 at that location.

Tasks can be assigned to the robots via the exchange of messages between the server 128 and the robots 120, e.g., over a suitable combination of local and wide-area networks. The server 128 can therefore be deployed at the facility 100, or remotely from the facility 100. In some examples, the server 128 is configured to assign tasks to robots 120 at multiple facilities, and need not be physically located in any of the individual facilities.

In addition to primary tasks such as item retrieval and transport, the robots 120 can perform a variety of supporting and/or maintenance tasks within the facility 100. Such tasks can include traveling to charging docks (not shown) within the facility 100 to charge batteries of the robots 120, or travelling to predetermined staging locations within the facility 100 to await charging or primary task assignment. Other examples of supporting and/or maintenance tasks can include inspection of various elements of the facility 100, e.g., to update a map of the facility 100 stored at the server 128 and deployed to the robots 120 for navigational purposes. Updating the map can include travelling a region of the facility 100, e.g., by a robot 120, and capturing sensor data to detect the positions of objects within the region (e.g., support structures 104 and the like). Periodically performing map updating tasks can update the map to reflect physical movements of objects in the facility 100, e.g., rearrangement of aisle 112 layouts.

Further examples of supporting and/or maintenance tasks performed by the robots 120 can include inspecting fiducial markers such as retroreflectors disposed as navigational aids on structures within the facility 100 (e.g., the support structures 104, conveyor belts, or other item-handling equipment with which the robots 120 may interact). Inspection of fiducial markers can include detecting the markers and comparing detected marker positions within the coordinate system 124 to expected positions of such markers. Still further examples of supporting and/or maintenance tasks include inventory checks, e.g., involving travelling an aisle 112 by a robot 120 and capturing images of the items 108 within the aisle 112, for later processing (e.g., by the robot 120 or by the server 128) to detect item identifiers and determine whether any items 108 are out of stock, misplaced, or the like. Supporting and/or maintenance tasks can also include a network mapping task, e.g., to travel a region of the facility 100 and record signal strength measurements (e.g., received signal strength indicators or RSSIs) and access point identifiers corresponding to wireless networking infrastructure within the facility 100. Such data can be employed to generate a heat-map of Wi-Fi reception throughout the facility 100, e.g., to determine whether to adjust the deployment of the network infrastructure to improve reception, throughput, or the like.

Some supporting and/or maintenance tasks are robot-specific, such as calibration tasks, e.g., to calibrate odometry sensors of a robot 120, perform battery conditioning at a robot 120, upload collected data (e.g., images of an aisle 112 as mentioned earlier) to the server 128, and the like.

The range of tasks performed by the robots 120 is such that controlling all task assignments at the server 128 may be computationally costly. Further, conducting all task assignments at the server 128 can lead to suboptimal usage of the robots 120. For example, when a robot 120 completes a task more quickly than expected, or aborts a task due to an obstruction, that robot 120 may remain idle for some period of time until the server 128 is able to assign a further task to the robot 120.

The robots 120 are therefore configured, as discussed in detail below, not only to execute tasks assigned by the server 128, but also to maintain a local repository of self-assigned task definitions, and to independently perform self-assigned tasks selected from the repository under certain conditions. In general, the robots 120 are configured to periodically assess one or more local activity metrics associated with tasks assigned to the robots 120 by the server 128. When the local activity metric(s) meet one or more idle criteria, the robots 120 can be configured to self-assign tasks, thereby increasing utilization time for the robots 120.

Figure 2:
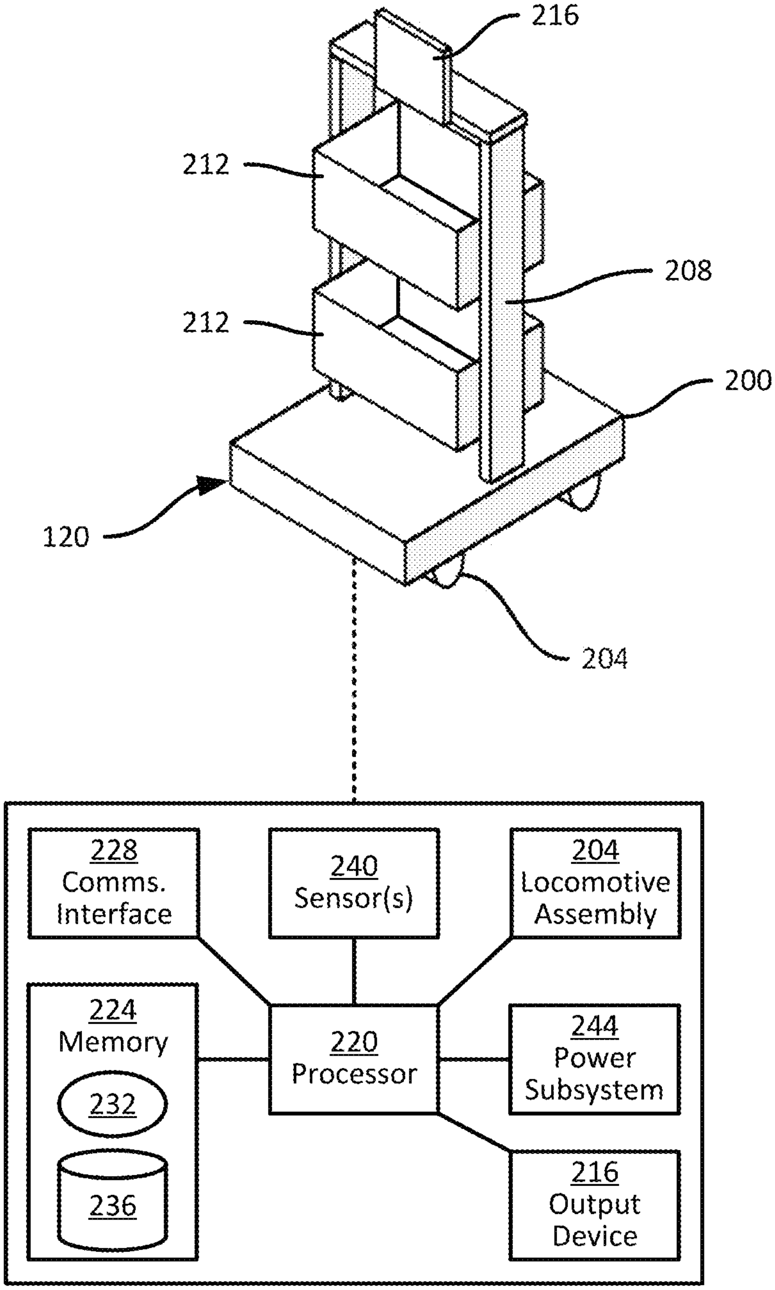
FIG. 2 is a diagram of certain components of a mobile robot of FIG. 1.

Before discussing the functionality implemented by the robots 120 in greater detail, certain components of the robots 120 are discussed with reference to FIG. 2. As shown in FIG. 2, each robot 120 includes a chassis 200 supporting various other components of the robot 120. In particular, the chassis 200 supports a locomotive assembly 204, such as one or more electric motors driving a set of wheels, tracks, or the like. The locomotive assembly 204 can include one or more sensors such as a wheel odometer, an inertial measurement unit (IMU), and the like.

The chassis 200 also supports receptacles, shelves, or the like, to support items 108 during transport. For example, the robot 120 can include a selectable combination of receptacles 212. In the illustrated example, the chassis 200 supports a rack 208, e.g., including rails or other structural features configured to support receptacles 212 at variable heights above the chassis 200. The receptacles 120 can therefore be installed and removed to and from the rack 208, enabling distinct combinations of receptacles 212 to be supported by the robot 120.

The robot 120 can also include an output device, such as a display 216. In the illustrated example, the display 216 is mounted above the rack 208, but it will be apparent that the display 216 can be disposed elsewhere on the robot 120 in other examples. The display 216 can include an integrated touch screen or other input device, in some examples, The robot 120 can also include other output devices in addition to or instead of the display 216. For example, the robot 120 can include one or more speakers, light emitters such as strips of light-emitting diodes (LEDs) along the rack 208, and the like.

The chassis 200 of the robot 120 also supports various other components, including a processor 220, e.g., in the form of one or more central processing units (CPU), graphics processing units (GPU), or dedicated hardware controllers such as application-specific integrated circuits (ASICs). The processor 220 is communicatively coupled with a memory 224, e.g., a suitable combination of volatile and non-volatile memory elements. The processor 220 is also coupled with a communications interface 228, such as a wireless transceiver enabling the robot 120 to communicate with other computing devices, such as the server 128 and other robots 120.

The memory 224 stores various data used for autonomous or semi-autonomous navigation, including an application 232 executable by the processor 220 to implement navigational and other task execution functions. In some examples, the above functions can be implemented via multiple distinct applications stored in the memory 224. The memory 224 also stores a local repository 236 of self-assigned task definitions, as noted earlier.

The chassis 200 can also support a sensor 240, such as one or more cameras and/or depth sensors (e.g., lidars, depth cameras, time-of-flight cameras, or the like) coupled with the processor 220. The sensor(s) 240 are configured to capture image and/or depth data depicting at least a portion of the physical environment of the robot 120. Data captured by the sensor(s) 140 can by used by the processor 220 for navigational purposes, e.g., path planning, obstacle avoidance, and the like, as well as for updating a map of the facility in some examples.

The components of the robot 120 that consume electrical power can be supplied with such power by a power assembly 244, e.g., including one or more rechargeable batteries and associated hardware for recharging the batteries, such as a charging port on the chassis 200 or the like.

Figure 3:
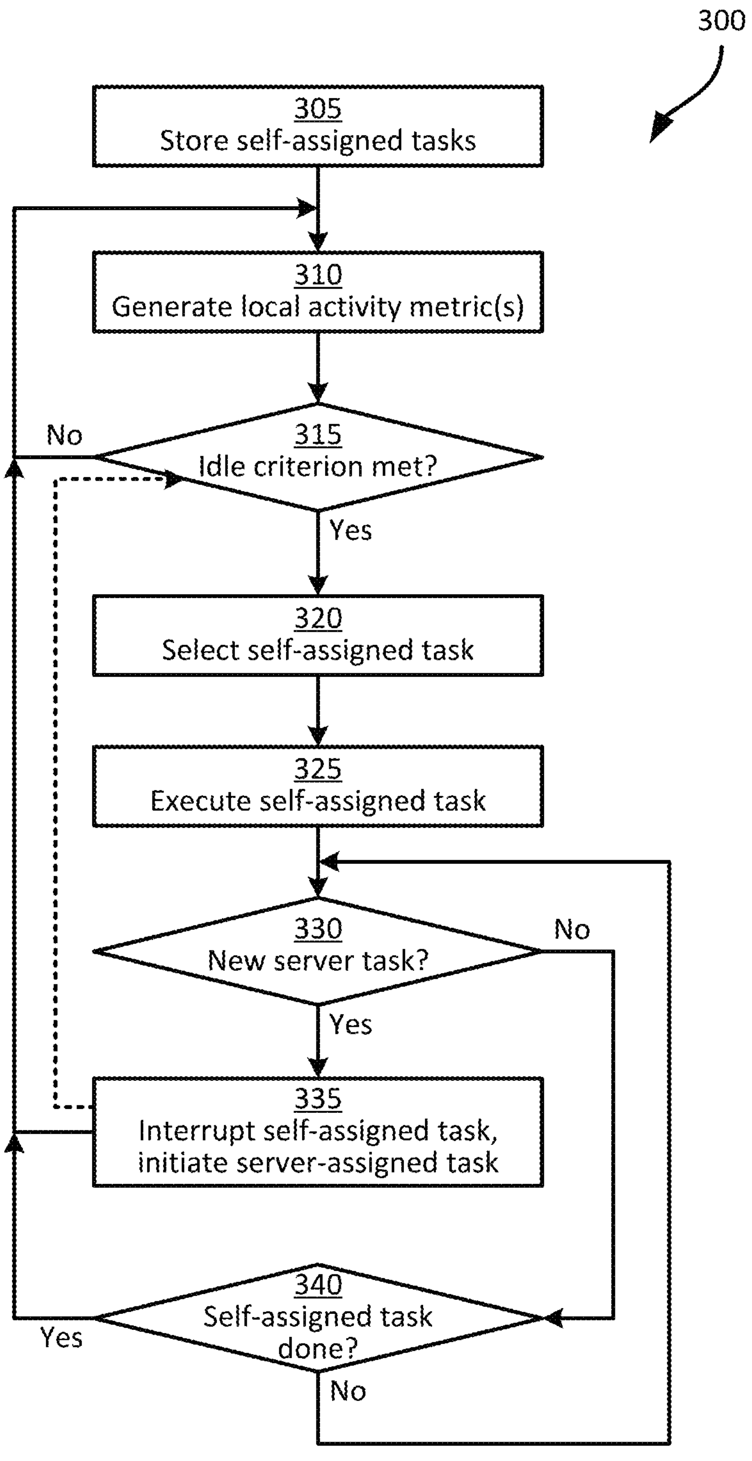
FIG. 3 is a flowchart illustrating a method of local idle time utilization.

Turning to FIG. 3, a method 300 of local idle time utilization is illustrated. The method 300 is described below in conjunction with its example performance by a robot 120, e.g., via execution of the application 232 by the processor 220. Instances of the method 300 can be performed independently by each of the robots 120 in the facility 100.

Figure 4:
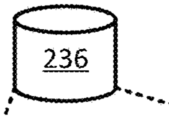
FIG. 4 is a diagram illustrating an example performance of block 305 of the method of FIG. 3.

At block 305, the robot 120 is configured to store a set of self-assigned task definitions, e.g., in the repository 236 mentioned above. Each self-assigned task definition contains various data that can be used by the processor 220 to perform the corresponding task, as well as evaluate when or whether to perform the corresponding task. Turning to FIG. 4, example contents of the repository 236 is illustrated, in the form of a plurality of records 400-1, 400-2, 400-3, and 400-4, each defining a self-assigned task. The self-assigned task definitions 400 need not be stored in tabular format as shown in FIG. 4, in other examples.

Each task definition 400 includes data that can be processed by the processor 220 to perform the corresponding task. Such data can include a series of navigational instructions, commands to enable various components of the robot 120, and the like. Each task definition 400 can also include, as shown in FIG. 4, a task identifier 404 such as an index number, task name, or the like. The example task definitions 400 shown in FIG. 4, as indicated by the task names 404, include a wheel odometer calibration task defined by the record 400-1 (e.g., in which the robot 120 may travel a predetermined course in the facility 100 to compare a previously stored length of the course with a travel distance measured by the odometer of the locomotive assembly 204). The example task definitions 400 also include a post-processing task defined by the record 400-2, e.g., in which images or other data captured via the sensors 240 are processed and/or uploaded to the server 128. The example task definitions 400 also include a mapping task (record 400-3) for a predetermined region “A” of a map of the facility 100, and a mapping task (record 400-4) for a predetermined region “B” of a map of the facility 100. The regions A and B may be separate aisles, sets of aisles, or other portions of the facility 100. The mapping tasks may include, for example, traveling to the corresponding predetermined region and initiating a simultaneous localization and mapping (SLAM) process to detect and localize structural features of the facility 100 in the relevant region.

Each task definition 400 can also include indications 408 of one or more subsystems of the robot 120 involved in the execution of the corresponding self-assigned task. In other examples, the subsystem indications 408 can be omitted. When present in the repository 236, the subsystem indications can be used by the robot 120 to assess idle criteria on a per-subsystem basis, such that a self-assigned task may be initiated simultaneously with a server-assigned task, so long as the self-assigned task does not interfere with the server-assigned task. For example, the robot 120 may initiate a self-assigned data post-processing task while performing a charging task assigned by the server 128.

As shown in FIG. 4, the subsystem indicators 408 indicate the status of components, or sets of components, that is expected in order to initiate performance of the corresponding self-assigned task. For example, the calibration and mapping tasks defined in the records 400-1, 400-3, and 400-4 indicate that a navigational subsystem (e.g., including the locomotive assembly 204, at least certain sensors 240, and at least a threshold portion of CPU utilization) is expected to be available. In addition, the records 400-1, 400-3, and 400-4 indicate that a charging subsystem (e.g., a charge port and charge controller of the power assembly 244) is expected to be available.

That is, the robot 120 may not initiate the calibration or mapping tasks if either of the navigational subsystem and the charging subsystem are in use to execute a task assigned to the robot 120 by the server 128. As will be apparent, if the charging subsystem is occupied, navigating away from a charging dock to perform odometry calibration or mapping would interrupt the charging task. The task definition 400-2, in contrast, indicates that the charging subsystem is expected to be in use as a result of a server-assigned charging task, or that a battery charge level of the robot 120 is expected to be above a threshold (e.g., 70%) before beginning the post-processing task. The post-processing task, in other words, illustrates that the robot 120 need not be entirely idle to begin a self-assigned task. In other examples, the subsystem indicators 408 can be omitted.

Each task definition 400 can further include prioritization criteria 412. The prioritization criteria are used by the robot 120 (specifically, by the processor 220) to select between the self-assigned tasks. For example, prioritization criteria can include a predetermined target frequency for each task (e.g., weekly for calibration, and monthly for the mapping tasks, in the illustrated example). The prioritization criteria 412 can also include, as in the example of the post-processing task definition, a threshold volume “Y” of data to be processed (which may be combined with a target frequency in other examples). In further examples, as in the case of the task definition 400-1, the prioritization criteria can include elevation criteria, e.g., by which the corresponding task can receive a higher priority than indicated by target frequency. In the case of the calibration task 400-1, the task can be given an elevated priority (e.g., selected above any other self-assigned task) if a threshold “X” number of localization errors have been detected by the robot 120 since the previous calibration. In other examples, the prioritization criteria 412 can include priority levels (e.g., from one to four in this example), which can be used in conjunction with, or instead of, target frequencies, e.g., to select one self-assigned task when multiple tasks have aged sufficiently to meet their respective target frequencies.

In further examples, the prioritization criteria 412 can include location-based criteria, such as a distance threshold associated with either or both of the mapping tasks (400-3 and 400-4). For example, the distance threshold can define a distance between a current location of the robot 120 within the facility 100 and the corresponding region to be mapped, beyond which the corresponding mapping task will not be selected.

The task definitions 400 can also include metadata, such as a timestamp indicating the latest (i.e., most recent) execution of the corresponding task. The timestamp can be used in conjunction with target frequencies to determine whether a task has aged sufficiently to be performed again. In other examples, the timestamps can be used in the absence of target frequencies, e.g., to select the self-assigned task with the greatest age to perform.

A wide variety of other self-assigned tasks can also be defined in the repository 236, in addition to or instead of those shown in FIG. 4. Further, each robot 120 need not store the same set of self-assigned task definitions 400. For example, the robot 120-2 can be deployed within a restricted area of the facility 100, and may therefore be configured to travel only within "region A" of the facility 100. The repository 236 of the robot 120-2 may therefore omit the record 400-4. Still further, the prioritization criteria 412 and/or other metadata such as the previous execution timestamps 416 of each task can vary between robot 120.

Returning to FIG. 3, at block 310 the robot 120 is configured to generate one or more local activity metrics. The local activity metric(s) indicate whether local resources of the robot 120 are currently unoccupied by tasks assigned to the robot 120 by the server 128. In some examples, the processor 220 generates a local activity metric in the form of an idle time period that has elapsed since completion of the most recent task assigned to the robot 120 by the server 128, and a current time, without receipt of a further task assignment from the server 128.

In other examples, the processor 220 can generate a plurality of local activity metrics, e.g., for each subsystem indicated in the repository 236. For example, the processor 220 can determine an idle time period for each of the charging subsystem and the navigational subsystem. Local activity metrics other than idle time periods are also contemplated. For example, a percentage or other suitable fraction of CPU cycles consumed by a server-assigned task can be used as a local activity metric for the processor 220 itself (e.g., to determine whether a self-assigned task can be performed simultaneously with the server-assigned task).

At block 315, the processor 220 is configured to determine whether an idle criterion is met, e.g., by the local activity metric(s) generated at block 310. In some examples, the idle criterion is a threshold idle time period, and the processor 220 can determine whether an idle time period determined at block 310 meets or exceeds the threshold idle time period. The threshold can be predetermined, e.g., as a value stored in the memory 224. In other examples, the threshold can be dynamically updated by the processor 220, e.g., based on historical data collected defining previous idle periods. For example, the processor 220 can store any idle period determined at block 310, and set the threshold at a predetermined fraction (e.g., 25%, although a wide variety of other fractions can be used) of an average or other aggregated value derived from the idle time periods. In other examples, the processor 220 can determine, from historical idle time periods, a threshold beyond which any idle time period is likely to continue for at least a further period (e.g., fifteen minutes). The determined threshold can be employed at block 315.

When multiple local activity metrics are generated at block 310, the processor 220 can compare each of the local activity metrics to a single idle criterion. In other examples, however, the processor 220 can compare each local activity metric to a distinct idle criterion (e.g., different threshold time periods can be employed for different subsystems of the robot 120).

When the determination at block 315 is negative, the processor 220 returns to block 310, to continue monitoring local activity metrics and repeating the determination at block 315. In some examples, the idle criterion evaluated at block 315 can include not only whether a subsystem-specific local activity metric meets a threshold, but also whether the repository 236 contains any self-assigned task definitions corresponding to that subsystem. For example, turning to FIG. 5, a first local activity metric 500 corresponding to the navigation subsystem is shown, indicating an idle time of two minutes. A second local activity metric 504 is also shown, indicating an idle time for the charging subsystem of thirty-nine minutes. Both metrics 500 and 504 can be compared to a threshold idle time period 508 of four minutes. Although the metric 504 exceeds the threshold 508, no tasks (as seen in FIG. 4) can be executed when the charging subsystem is idle and the navigation subsystem is not idle. In other words, a set 512 of available self-assigned tasks compatible with the local activity metric satisfying the idle criterion is empty. The determination at block 315 is therefore negative in this example.

Figure 5:
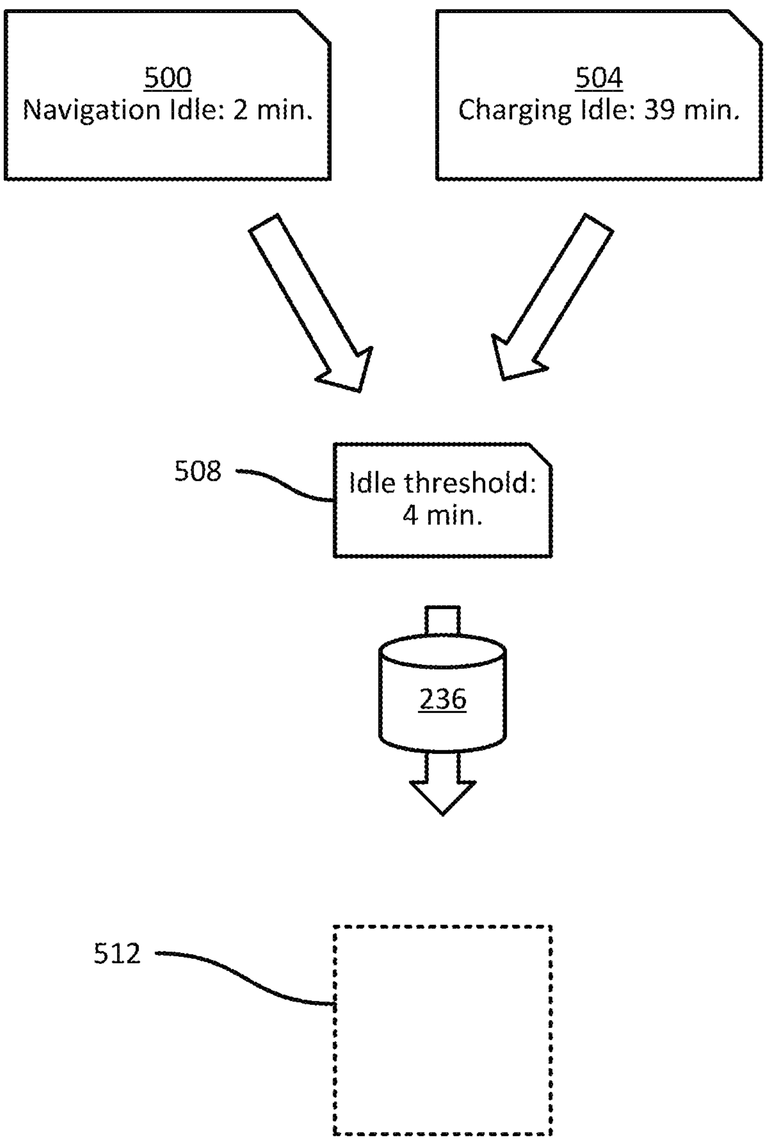
FIG. 5 is a diagram illustrating an example performance of block 315 of the method of FIG. 3.
Figure 6:
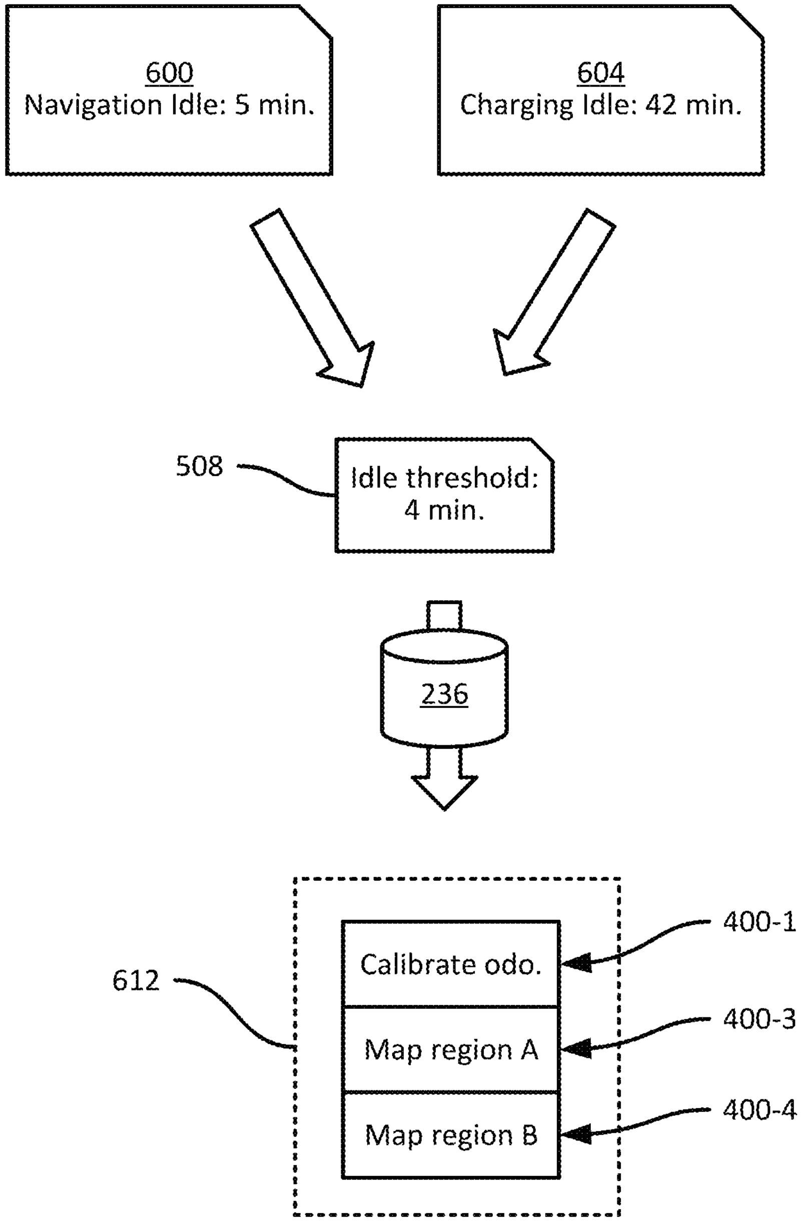
FIG. 6 is a diagram illustrating an example performance of block 315 of the method of FIG. 3.

Turning to FIG. 6, further first and second local activity metrics 600 and 604 are illustrated, e.g., generated three minutes later than those shown in FIG. 5. As will be apparent from FIG. 6, both metrics 600 and 604 exceed the threshold 508, and three of the task definitions 400 from FIG. 4 are eligible for selection. The determination at block 315 is therefore affirmative.

In further examples, the idle criteria can include whether an indication of idle time has been received from the server 128. For example, the server 128 can send a command or other message to the robot 120 indicating that no further server-assigned tasks are expected to be allocated to the robot 120 for a time period specified in the command. In response to such a command, the determination at block 315 can be affirmative, e.g., regardless of whether the local activity metrics from block 310 satisfy other idle criteria such as the threshold 508.

Returning to FIG. 3, following an affirmative determination at block 315, at block 320 the processor 220 is configured to select a self-assigned task, e.g., according to the prioritization criteria 412 and/or timestamps 416. For example, the processor 220 can filter the task definitions 400 to omit those incompatible with the subsystem states required by the task definitions 400. Following such filtering, the processor 220 can determine an age associated with each remaining task definition 400, such as a difference between the most recent performance and a current time. The processor 220 can then select the task with the greatest age. In other examples, the processor 220 can determine an age for each task definition 400 according to the corresponding timestamp 416 and the target frequency defined in the prioritization criteria. For example, the age for a task can the a difference between the next expected performance of the task, determined from the timestamp 416 and the target frequency (e.g., one week after Sep. 13, 2022 for odometry calibration) and the current time.

As will be apparent, other prioritization criteria, such as the volume of data in the task definition 400-2, the elevation criteria in the task definition 400-1, or the like, may also be employed to select a task at block 320. Priority indicators ranking the task definitions 400 can be used when prioritization criteria for multiple tasks are satisfied.

Figure 7:
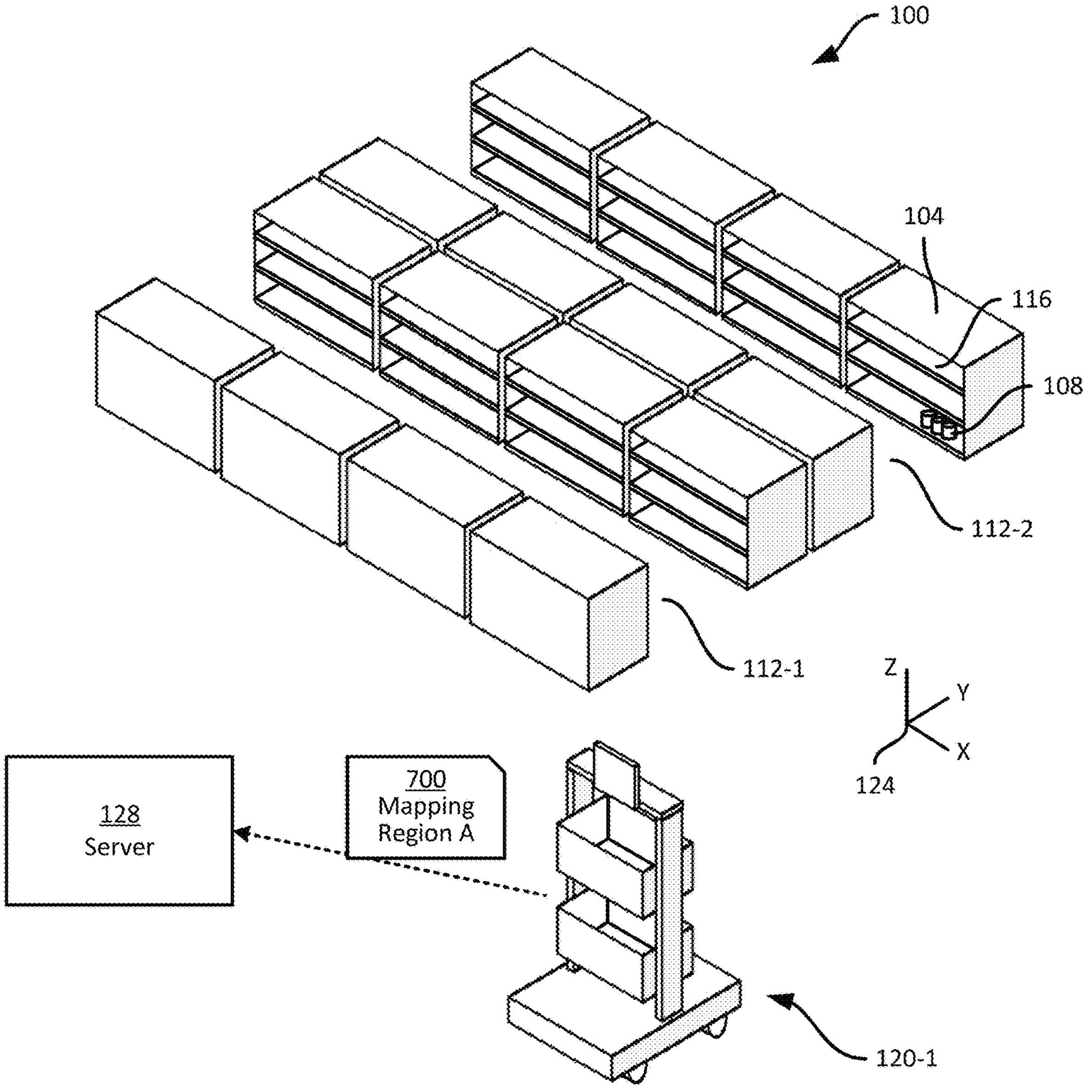
FIG. 7 is a diagram illustrating transmission of a message to a central server following initiation of a self-assigned task at block 325 of the method of FIG. 3.

At block 325, the processor 220 is configured to initiate execution of the self-assigned task selected at block 320. Execution of the self-assigned task can be conducted according to the instructions contained in the corresponding task definition 400. In some examples, as shown in FIG. 7, in response to initiating execution of the self-assigned task, the robot 120 can transmit a message 700 to the server 128 reporting initiation of the self-assigned task. In the illustrated example, the message 700 indicates that the robot 120 has initiated execution of a mapping task for region A of the facility 100.

At block 330, while executing the self-assigned task, the robot 120 is configured to await receipt of a server-assigned task. When no server-assigned task is received, the determination at block 330 is negative, and the robot 120 is configured to determine, at block 340, whether the self-assigned task is complete. When the determination at block 340 is negative, the robot 120 continues performance of the self-assigned task and repeats the determination at block 330. When the determination at block 340 is affirmative, the robot 120 returns to block 310.

When the determination at block 330 is affirmative, indicating that a new server-assigned task has been received at the robot 120, at block 335 the processor 220 is configured to interrupt the self-assigned task under execution, and initiate performance of the server-assigned task. Server-assigned tasks, in other words, take priority over any self-assigned tasks. In some examples, before interrupting the self-assigned task at block 335, the processor 220 can determine whether an estimated time to complete the self-assigned task is below a threshold (e.g., thirty seconds, or another suitable threshold). When the determination is affirmative, the robot 120 may instead complete the self-assigned task before initiating the server-assigned task. Following block 335, the robot 120 may also update the idle criterion used at block 315, e.g., if a dynamic idle time period threshold is employed. Specifically, the receipt of a server-assigned task signals the end of a period of idle time, which the processor 220 can add to the previously mentioned historical data.

Various other self-assigned tasks and prioritization criteria are contemplated, in addition to those set out above. For example, another self-assigned task that can be defined in the repository 236 is a seek-work task, in which the robot 120 travels to an area of the facility at which human workers, such as pickers, are stationed. The robot 120 can, upon arrival, advertise that the robot 120 is available for task assignments, e.g., on the display 216 or other output devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

storing, at a mobile robot, a local repository of self-assigned task definitions;

determining, at a processor of the mobile robot, that a local activity metric associated with tasks assigned to the mobile robot by a central server meets an idle criterion;

in response to determining that the local activity metric meets the idle criterion, selecting, by the processor of the mobile robot, one of the self-assigned task definitions from the local repository; and initiating execution of a self-assigned task corresponding to the selected self-assigned task definition at the mobile robot;

wherein each of the self-assigned tasks corresponding to the self-assigned task definitions is independently executable by the processor of the mobile robot where no task is assigned to the mobile robot by the central server; and wherein the idle criterion is assessed on a per-subsystem basis, such that the self-assigned task can be executed simultaneously with one or more of the tasks assigned to the mobile robot by the central server.

2. The method of claim 1, further comprising: sending an indication of the selected self-assigned task definition to the central server.

3. The method of claim 1, further comprising:

after initiating execution of the selected self-assigned task, and prior to completion of the selected self-assigned task, receiving a task assignment from the central server; and interrupting execution of the selected self-assigned task.

4. The method of claim 3, further comprising, prior to interrupting execution of the selected self-assigned task:

determining that a remaining execution time for the selected self-assigned task exceeds a threshold.

5. The method of claim 1, further comprising, prior to determining that the local activity metric meets the idle criterion, generating the local activity metric by:

determining an idle time period elapsed since completion of a latest task assigned to the mobile robot by the central server, without receipt of a further task assignment from the central server;

wherein determining that the local activity metric meets the idle criterion includes determining that the idle time period exceeds a threshold idle time period.

6. The method of claim 5, wherein the threshold idle time period is predetermined.

7. The method of claim 5, further comprising:

collecting, prior to generating the local activity metric, historical data defining previous idle time periods at the mobile robot; and dynamically determining the threshold idle time period based on the historical data.

8. The method of claim 1, wherein each self-assigned task definition identifies a corresponding one of a plurality of subsystems of the mobile robot;

wherein the local activity metric meeting the idle criterion corresponds to one of the subsystems; and wherein selecting the one of the self-assigned task definition includes restricting the selection to self-assigned task definitions identifying the one of the subsystems.

9. The method of claim 1, wherein selecting the one of the self-assigned task definitions from the local repository includes prioritizing the self-assigned task definitions according to at least one of:

(i) a location of the mobile robot;

(ii) a predetermined frequency of each self-assigned task;

(iii) time periods elapsed since respective previous performances of each self-assigned task;

(iv) a priority indicator included in at least one of the self-assigned task definitions;

(v) expected completion times of the self-assigned task;

(vi) a battery charge level of the mobile robot.

10. The method of claim 1, wherein the self-assigned task definitions include at least one of:

(i) a mapping task for a region of a facility in which the mobile robot is deployed;

(ii) a calibration task;

(iii) a data processing task; and (iv) traveling to an area of the facility and generating output indicating that the mobile robot is available for task assignment.

11. A mobile robot, comprising:

a memory storing a local repository of self-assigned task definitions;

a locomotive assembly;

a communications interface communicatively connecting the mobile robot with a central server; and a processor configured to:

determine that a local activity metric associated with tasks assigned to the mobile robot by the central server meets an idle criterion;

in response to determining that the local activity metric meets the idle criterion, select one of the self-assigned task definitions from the local repository; and initiate execution of a self-assigned task corresponding to the selected self-assigned task definition at the mobile robot;

wherein each of the self-assigned tasks corresponding to the self-assigned task definitions is independently executable by the processor of the mobile robot where no task is assigned to the mobile robot by the central server; and wherein the idle criterion is assessed on a per-subsystem basis, such that the self-assigned task can be executed simultaneously with one or more of the tasks assigned to the mobile robot by the central server.

12. The mobile robot of claim 11, wherein the processor is further configured to: send an indication of the selected self-assigned task to the central server.

13. The mobile robot of claim 11, wherein the processor is further configured to:

after initiating execution of the selected self-assigned task, and prior to completion of the selected self-assigned task, receive a task assignment from the central server; and interrupt execution of the selected self-assigned task.

14. The mobile robot of claim 13, wherein the processor is further configured, prior to interrupting execution of the selected self-assigned task, to:

determine that a remaining execution time for the selected self-assigned task exceeds a threshold.

15. The mobile robot of claim 11, wherein the processor is further configured, prior to determining that the local activity metric meets the idle criterion, to generate the local activity metric by:

determining an idle time period elapsed since completion of a latest task assigned to the mobile robot by the central server, without receipt of a further task assignment from the central server;

wherein the processor is configured to determine that the local activity metric meets the idle criterion by determining that the idle time period exceeds a threshold idle time period.

16. The mobile robot of claim 15, wherein the threshold idle time period is predetermined.

17. The mobile robot of claim 15, wherein the processor is further configured to:

collect, prior to generating the local activity metric, historical data defining previous idle time periods at the mobile robot; and determine the threshold idle time period based on the historical data.

18. The mobile robot of claim 11, wherein each self-assigned task definition identifies a corresponding one of a plurality of subsystems of the mobile robot;

wherein the local activity metric meeting the idle criterion corresponds to one of the subsystems; and wherein the processor is further configured to select the one of the self-assigned task definition by restricting the selection to self-assigned task definitions identifying the one of the subsystems.

19. The mobile robot of claim 11, wherein the processor is further configured to select the one of the self-assigned task definitions from the local repository by prioritizing the self-assigned task definitions according to at least one of:

(i) a location of the mobile robot;

(ii) a predetermined frequency of each self-assigned task definition;

(iii) time periods elapsed since respective previous performances of each self-assigned task definition;

(iv) a priority indicator included in at least one of the self-assigned task definitions;

(v) expected completion times of the self-assigned task definitions;

(vi) a battery charge level of the mobile robot.

20. The mobile robot of claim 11, wherein the self-assigned task definitions include at least one of:

(i) a mapping task for a region of a facility in which the mobile robot is deployed;

(ii) a calibration task;

(iii) a data processing task; and (iv) traveling to an area of the facility and generating output indicating that the mobile robot is available for task assignment.

* * * * *